United States Patent [19]

Schmidt

[11] Patent Number: 5,564,049
[45] Date of Patent: Oct. 8, 1996

[54] INDUSTRIAL CONTROLLER PROGRAMMING METHOD USING EXTERNAL CONNECTION DATABASE

[75] Inventor: Michael W. Schmidt, Franklin, Wis.

[73] Assignee: Allen-Bradley Company, Inc., Milwaukee, Wis.

[21] Appl. No.: 283,083

[22] Filed: Jul. 29, 1994

[51] Int. Cl.$^6$ ................................................. G06F 17/30
[52] U.S. Cl. ..................... 395/600; 395/800; 364/147
[58] Field of Search ................................. 395/600, 650, 395/800; 364/147

[56] References Cited

U.S. PATENT DOCUMENTS

| | | | |
|---|---|---|---|
| 4,722,043 | 1/1988 | Nagamine et al. | 364/147 |
| 4,907,190 | 3/1990 | Sasaki et al. | 395/800 |
| 4,908,746 | 3/1990 | Vaughn | 364/147 |
| 5,058,043 | 10/1991 | Skeirik | 364/550 |
| 5,283,896 | 2/1994 | Temmyo et al. | 395/650 |
| 5,325,522 | 7/1994 | Vaughn | 395/600 |

OTHER PUBLICATIONS

Korth and Silberschatz, *Database System Concepts*, McGraw–Hill Book Company (New York, 1986), pp. 391–402.

*IBM Personal Computer Professional FORTRAN Reference*, (Ryan McFarland, 1987) pp. 2–9, 2–20, 2–28 –2–33, 2–141 –2–142.

Donald J. Modell, "PLC–Based DCSs Make The Most of Existing Control Equipment", *I&CS* (*Instrumentation and Control Systems*), vol. 63, No. 10, Oct., 1990, pp. 41–44.

Joseph R. Crum, "Clusterwide Intertask Communication Using the Lock Manager", *VAX Professional*, vol. 14, No. 5, Sep.–Oct., 1992, pp. 21–25.

*Primary Examiner*—Thomas G. Black
*Assistant Examiner*—Paul R. Lintz
*Attorney, Agent, or Firm*—Keith M. Baxter; John M. Miller; John J. Horn

[57] ABSTRACT

Subprograms together making up an industrial controller program are encapsulated in shells which make explicit the connection relationships and data flow directions of the subprogram normally implicit in the sharing of variables. The shells also identify the consumer/producer relationship of the variables as may be used to identify data contention problems. Actual connections between subprograms along which variables may be shared are externalized in a connection database that permits ready cross-referencing of such data sharing. Connection information stored in the shell may be used when a shell is cut and pasted to provide an initial suggestion of how to connect the new pasted shell. The automatic reconnection of the pasted shell refers to the previous connections and makes use of a hierarchical arrangement previously determined by the programmer reflecting the logic of the program.

9 Claims, 3 Drawing Sheets

SHELL DATA

SHELL NAME
SHELL KEY
PARENT SHELL KEY
PROCESSOR KEY
CODE FRAGMENT KEY

CABLE DATA

CABLE NAME
CABLE KEY
CONNECTION IMAGE
AUTHOR KEY
PRODUCER/CONSUMER

WIRE DATA

WIRE NAME
WIRE KEY
INPUT/OUTPUT
DATA TYPE
ADDR
MANUALLY ASSIGNED : Y/N

FIG. 6

INDUSTRIAL CONTROLLER PROGRAMMING METHOD USING EXTERNAL CONNECTION DATABASE

FIELD OF THE INVENTION

The present invention relates to industrial controllers for the real-time control of industrial processes, and in particular, to a method of programming industrial controllers where the sharing of variables by different portions of the program is explicit in a shell structure that reveals the consumer/producer and input/output relationship of the variables.

BACKGROUND OF THE INVENTION

Industrial controllers are special purpose computers used for controlling industrial processes and manufacturing equipment. Under the direction of a stored program, an industrial controller examines a series of inputs, reflecting the status of the controlled process, and changes a series of outputs controlling the industrial process. The inputs and outputs may be binary, that is on or off, or analog, reading or providing a value within a continuous range.

An industrial controller differs from a conventional computer in two respects. First, unlike a conventional computer, the hardware of the industrial controller changes substantially for different applications. This reconfiguration is facilitated by assembling the industrial controller from a number of standard modules each performing a different function. Different combinations of modules are selectively linked together on a backplane or connected together by one or more communication links to customize the industrial controller to the particular process or equipment being controlled. The modules may include, for example, various processors, power supplies, communication interfaces and input and output interfaces as well as specialized controllers such as motor controllers or temperature controllers.

The second difference between industrial controllers and conventional computers is that the software run by an industrial controller is often "one of a kind", that is, unique to a single location. This follows both from the variability of the hardware and more generally from the wide range of different processes and equipment controlled by industrial controllers.

Because most industrial controller applications require the writing of original software, it is important that such software be easy to write, troubleshoot and maintain. One successful method of writing software is that of dividing the program into a series of smaller subprograms each of which may be separately written and tested.

Industrial control programs often lend themselves to subdivision along the lines drawn by the physical, controlled processes. For example, if a factory includes a conveyor belt, a punch press and two clamps for holding work to be punched, a logical division of the software may be into control routines for each of the punch, conveyor belt and clamp.

A given clamp, for example, will have inputs controlling whether it is to be advanced or retracted and output signals indicating that it has achieved those particular states. A controlling routine will detect contradictory commands and may permit the imposition of internal states such as delays to accommodate the physical operating characteristics of the clamp.

With the partitioning of a large program into subprograms, it becomes desirable to be able to re-use those subprograms in the creation of other programs either for the same or different processes. Ideally, manufacturers of particular physical equipment that is controlled could provide subprograms for controlling that equipment much in the same way that the manufacturers of computer printers now provide printer "drivers" for those printers, the drivers being short programs to permit the interface of a particular computer to that particular printer.

Nevertheless, such reuse of subprograms is not common in the industrial control field. Although portions of an industrial controller program may be copied into a new program, that portion will generally not function without further modification because its variables, as identified by variable addresses, will normally be different from the addresses of those variables in use in the new program.

Reconciling the addresses of the variables of the copied subprogram to match those of the larger incorporating program is nearly impossible, however, because it requires a sifting through of both programs to identify all variables that may be read or written to by the copied fragment. Because it is not necessarily the case that the names of the variables used in either of the programs will indicate their proper connection, the set of shared variables must be identified through their context in the program, an extremely difficult exercise.

The difficulty of this task is compounded by the fact that many languages for the programming of industrial controllers simply do not permit the generation of a list of variables cross-referenced by functional subprograms.

The problem of coordinating variables when copying subprograms into new larger programs is particularly acute in the context of industrial control programs which by their nature have many variables representing both input and output data from sensors and controllers physically connected to the controlled process or machine. A method that permitted the ready reuse of previously written subprograms in the creation of a new, larger industrial control program would be highly desirable.

SUMMARY OF THE INVENTION

The present invention permits subprograms to be practically reused either in the same or different industrial control programs. Key to this invention is a data structure which makes explicit the paths of data flow between the subprograms through "shells" encapsulating the subprograms and which identifies the variables both as input or output and as consumer or producer. In particular, knowledge about the classification of the variables as consumers and producers provides a more complete view of the data exchange necessary to detect data contentions arising in the reconnection of a subprogram to a larger program.

Specifically, in an industrial controller having a processor that may execute a first and second program portion sharing a value between a first and second variable, the invention is a data structure that contains the first and second program portions in shells. The first shell associated with the first program portion includes a list identifying the first variable and whether the variable is a consumer or producer with respect to that program portion and whether the variable is an input or output with respect to that program portion. Similarly, the second shell associated with the second program includes a list identifying the second variable and whether that variable is a consumer or producer with respect to the second program portion and whether that variable is an input or output with respect to the second program portion. Each of the first and second shells has a unique identifying key number.

A connection database shared by the shells stores data indicating that the first variable of the first shell identified by its key number shares its value with the second variable of the second shell as identified by its key number.

Thus, it is one object of the invention to make explicit the paths of data flow between the various portions of a program and the relationship of the variables sharing data. The connection database provides a simple source of connection information that may be used to establish a cross-reference table of shared variables. This cross reference may be used in trouble-shooting the complete program. The producer and consumer information permits data contentions to be identified as variables are shared among additional shells.

It is another object of the invention to provide a clear demarcation between functional elements of a program of an industrial controller to facilitate "cutting" and "pasting" such functional elements from and to other industrial controller programs. The shells hold all the inputs and outputs needed by the particular program element and the connection database provides an indication as to the type of connections required for those inputs and outputs.

The shells may be linked in a "tree" diagram of arbitrary configuration but reflecting the overarching logic of the interaction between the programs of the various shells. The path names may be given to the shells reflecting their position within that tree diagram.

Thus, it is another object of the invention to provide a structural association between shells independent of the paths of data flow but which incorporates additional information about the operation of the overall program that may be useful in reconnecting the program portions contained within the shells, when those portions are cut and pasted to another location. The use of a tree hierarchy increases the chance that the interconnections required of a particular shell that has been cut and pasted to a new location can be automatically identified. In particular, once a paste location of a pasted program portion is identified within a tree of shells, the list of the shell of that pasted program portion may be reviewed to identify input and output variables for that shell. The connection database may be queried for the path names of shells and variables of other program portions sharing values with the identified input and output variables of the shell of the pasted program portion. Then a search of the tree of shells from the paste location may be undertaken to identify corresponding shells to those identified in the connection database and a connection database may be written to establish new connections for the shell of the pasted program portion to those shells identified in the tree.

Thus, it is another object of the invention to use the information contained in the tree structure to automatically reconnect, cut and paste program portions to one or more other shells in a larger program with minimum human intervention.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Hardware Environment

Figure 1:
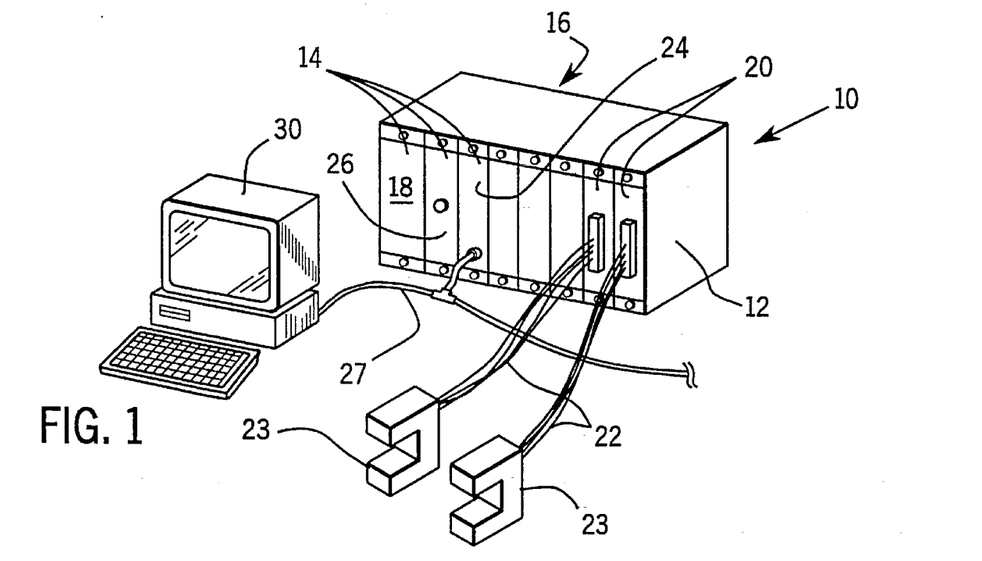
FIG. 1 is a perspective view of a simplified industrial controller having two clamps controlled by a first program portion running in a processor within an industrial controller rack and communicating with a diagnostic program within a workstation.

Referring now to FIG. 1, an industrial controller 10 suitable for use with the present invention provides a rack 12 holding a number of functional modules 14 electrically interconnected by a backplane 16 running along the rear of the rack 12. Each module 14 may be individually removed from the rack 12 thereby disconnecting it from the backplane 16 so that the industrial controller may be customized as to which modules 14 are used.

The modules 14 within the rack 12 may include, for example, a power supply module 18, a processor module 26, a communication module 24 and one or more I/O modules 20, among others.

Power supply module 18 receives an external source of power (not shown) and provides regulated voltages to the other modules 14 by means of conductors on the backplane 16.

The processor module 26 processes information provided by the communication module 24 and the I/O modules 20 according to a stored program contained in its memory (not shown).

The communication module 24 provides a high speed interface between the backplane 16 and an external link 27 which may connected to a workstation 30, the latter which provides a means of programming the industrial controller 10 and of displaying various diagnostic messages and diagrams.

The I/O modules 20 convert input signals on lines 22 connected to the external equipment to digital words for transmission on the backplane 16. Conversely, the I/O modules also convert digital words from the backplane 16 to the necessary signal levels for the control of the equipment. In this example, the controlled equipment includes clamps 23 which may be advanced or retracted by signals provided from the I/O modules 20 and which produce open and close signals verifying their state which may be received by I/O modules 20.

Industrial Controller Software

Figure 2:
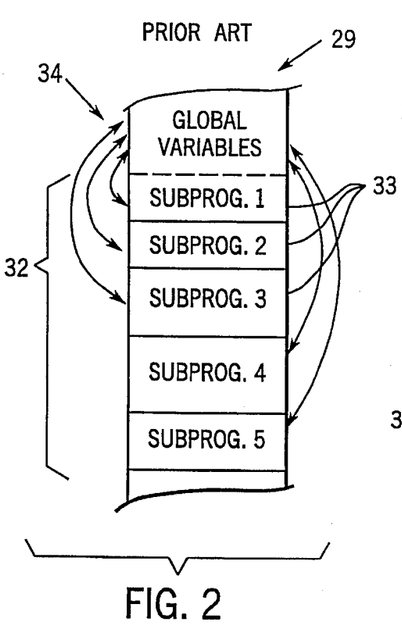
FIG. 2 is a schematic representation of prior art data sharing between various program portions of an industrial controller program.

Referring now to FIG. 2, a program for the industrial controller 10, such as may be entered on the workstation 30, typically includes a program portion 32 having computer instructions for arithmetic and logical operations on various variables as is well understood in the art. The program 29, as depicted in FIG. 2, represents the source code of the program such as would be entered by a programmer in distinction to the object code which is actually executed by the processor 26. The object code would typically have a different configuration reflecting the efficiencies of the processing unit.

Typically, the program portion 32 may be broken into one or more subprograms 33 which represent distinct functions of the program. These program divisions may be made arbitrarily but preferably are selected by the programmer to illuminate the logic and construction of the program 29.

As was previously mentioned, frequently a subprogram 33 will be associated with a particular piece of equipment being controlled such as a clamp 23. The clamp subprogram may pass data among other subprograms by the sharing of one or more global variables 34 often designated at the beginning of the program listing. For example, data generated by the clamp subprogram would be stored at global variables 34 and other subprograms can read this global variable to obtain input data from the clamp subprogram. Importantly, because communication between subprograms is implicit in this technique of sharing variables, it is normally difficult to ascertain the paths of data flow by inspection of the source program itself.

Shells

Figure 3:
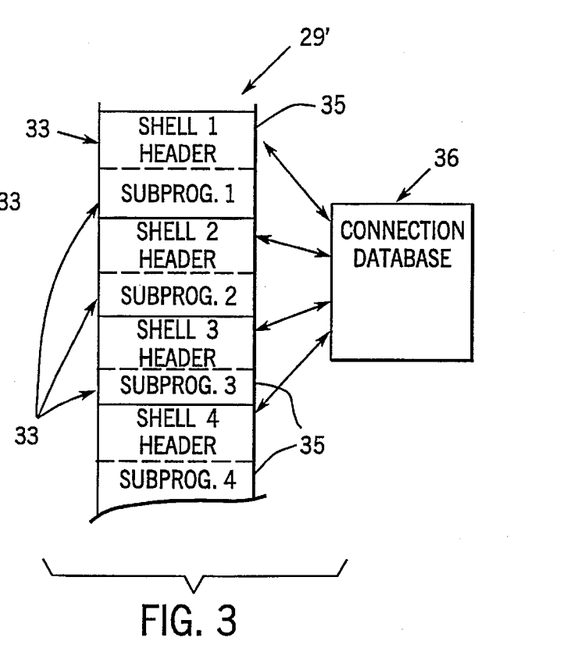
FIG. 3 is a schematic diagram similar to that of FIG. 2 showing the use of a connection database to make explicit the interconnections between various program portions of an industrial controller program, each now encapsulated in a shell.

Referring now also to FIG. 3, the present invention places each subprogram 33 into a separate shell 35 having a header preceding the subprogram as will be described. The header identifies in one place all the variables of the particular subprogram which are shared with other subprograms.

Although these variables, like the prior art, may have variable names, these variable names need not be identical to the variable names of other subprograms even if the data of those variables is common between those subprograms. Instead, the relationship between the variables described in each header of the shells 35 is made explicit in a separate connection database 36 which links variables of different shells to each other. Thus, for example, a variable named "open" for a clamp 23 may share its data with a variable named "state" in another shell and a variable named "ready" in yet a third shell. The equivalence of these variables is established in the data of the connection database 36 which effectively groups these three names.

Importantly, each variable in the shell is identified in a number of ways: its status as an input or output, its status as a producer or consumer, its author, and its connection image. As will be described, these additional dimensions of information facilitate the reuse of previously written subprograms.

Producer Consumer

The identification of a variable as an input or output is well understood. An input variable receives data from another subprogram while an output variable provides data to another subprogram. In contrast, a given variable's status as a consumer or producer is independent of whether it is an input or output. That is, there may be consumer-input variables as well as consumer-output variables and producer-input variables as well as producer-output variables. Generally, a variable is a producer if "but for" the subprogram of the shell of that variable there would be no reason for the connection.

This general philosophy is reflected in simple rules that cover connections between shells involving more than three variables, i.e. the interconnections of three or more variable together. Such connections fall into one of two categories: (1) a single output connected to multiple inputs or (2) a single input connected to multiple outputs. The producer is always the single "odd" variable, that is, the single input or output variable among the many output or input variable . Thus, in the first case, the output is a producer and in the second case, the input is a producer. Without the producer, there would be no communication whereas without one consumer, communication could still be envisioned.

This concept can be expanded to include also the case of two variables connected together by evaluating whether a new variable would be an input or an output according to the context of the program, thus making one variable a producer.

The significance of the producer/consumer categorization is that it provides information beyond that provided by input and output information. In particular, knowledge of the variable's producer or consumer status permits identification of data contention in the second case described above, where one input is connected to multiple outputs. In this situation, data contention problems occur if the multiple outputs connected to the single input have different values. Such situations must be identified so that a rule can be adopted to resolve any ambiguity in the data received by the input.

A number of different rules can be used depending on the desires of the programmer. For example, a first-in time rule allows the first output to communicate with the single input and to set a flag blocking all other outputs from communication with that input thus eliminating contention. Only when that first output relinquishes its communication with the input, by resetting the flag, can other outputs provide values to the input.

Alternatively, each of the multiple outputs may be given a numerical priority and the output value provided by the output of highest priority, when two or more outputs are contending, may be adopted. Producer/consumer information permit such contentions to be identified, facilitating the automatic connection of code fragments for industrial controllers.

Author

As mentioned above, each variable also provides an author key which is the identifier (key) of the shell which "authored" that connection between variables. The author of a particular connection reflects the historical connection of that variable with the variables of other shells. In particular, the author identifies the variable defining the connection to the other shell, that is the variable that served as a model in variable type (Boolean, integer, etc.) and direction (input and output) for the authored variable.

The significance of the author information is that when the subprogram of the shell is cut and pasted to a new environment, the author information can identify when new variables must be created in other shells to permit the connection of the present shell's cables.

Connection Image

Each variable also has a connection image list which describes all the shells having variables connected to that variable (thus sharing data with the subprogram of the instant shell). These shells are identified by their names and paths. The connection image is used when a subprogram is copied and pasted to a new program or a different location in the same program. The connection image provides initial guidance (subject to the confirmation of the programer) as to what shells the pasted shell might be connected. The connection image identifies the shells by their path names and thus implicitly makes use of the information as to control logic contained in the programmer's initial decomposition of the program into shells and the allocation of the shells into the hierarchy of a tree structure. Thus when a cut and pasted subprogram is placed into an environment with shells having similar names and tree locations as that from which it was cut, as may occur if the program has a repetitive structure, then the connection image will provide considerable help in reconnecting the pasted subprogram to the correct shells.

EXAMPLE I

Figure 5:
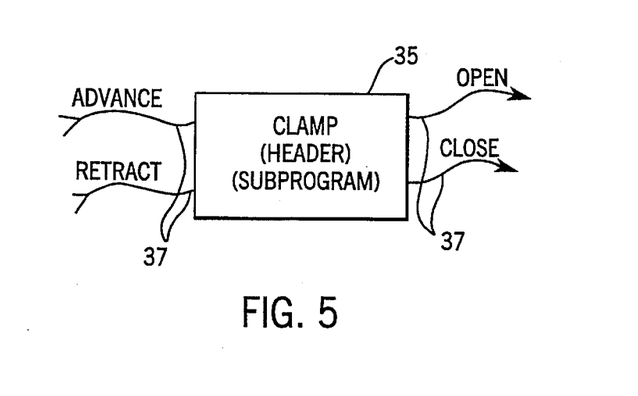
FIG. 5 is a representation of a single shell "cut" from a larger program having arrows representing severed connections made explicit by the shell and database structure.

Referring now to FIGS. 1 and 5, an example shell 35 holding a subprogram for controlling a clamp 23 receives two input signals and two output signals. One producer/input signal termed "advance" causes the subprogram to advance the jaws of the clamp 23 to a closed position by activating a solenoid (not shown). The second producer/input signal termed "retract" causes the subprogram to retract the jaws of the clamp 23 by the activation of a second solenoid. Generally, the second and first solenoid should not be activated at the same time and one task performed by the subprogram is the execution of logic to prevent this occurrence.

The two producer/output signals from the shell 35 include an "open" signal which derives from a limit switch (not shown) indicating that the jaw of the clamp 23 is, in fact, in the open position and a "close" signal indicating that the jaws of the clamp 23 is in the closed position. These signals can be used by the module to confirm that the clamp 23 has not jammed. The particular program of the subprogram that uses these input and output signals will vary depending on the particular clamp 23 as will be understood to those of ordinary skill in the art.

Other subprograms in other shells will normally develop the advance and retract signals used by the shell 35 and the shell 35 will provide the open and close signals to other shells within the program as well as to I/O modules 20 connected to the clamps 23.

Figure 4:
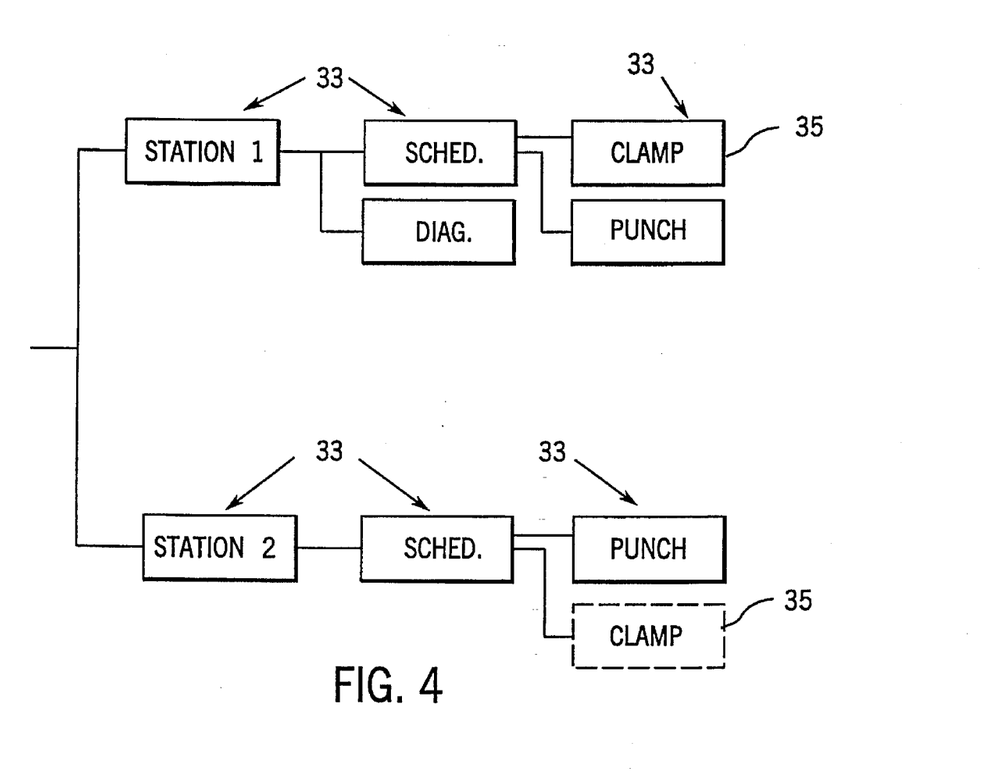
FIG. 4 is a tree structure showing interrelations between various shells of a hypothetical industrial controller program.

Referring also to FIG. 4, the shell 35 may be arranged in a tree structure with other shells. Generally, as will be described, any shell may communicate data with another shell regardless of that shell's location within the source code or within the tree structure. Thus, as far as communication of data goes, all shells are essentially interconnected with each other shell. Nevertheless, often there will be a logical or other hierarchy to the shells indicating a decomposition of control logic within the program. Such a hierarchy may be represented by a tree structure and independent of the interconnections of the shells.

In the example of FIG. 4, at the root of the tree are two "station" shells, STATION 1 and STATION 2, each corresponding approximately to a manufacturing station within a factory and holding a subprogram handling high level tasks such as the initiation of certain manufacturing operations on parts entering the station and the tracking of those parts. STATION 1 forms a node for branches leading to shells of a DIAGNOSTIC subprogram and a SCHEDULER subprogram.

The DIAGNOSTIC subprogram may handle the display of the state of the various components of the manufacturing station on the workstation 30 to provide a constant visual representation of the manufacturing process and may further display certain errors or malfunctions such as the jamming of a clamp or the failure of a clamp to respond within a predetermined period of time.

The SCHEDULER coordinates the operation of the various components of the manufacturing station controlling the clamp to open and close in coordination with another piece of equipment, in this case indicated to be a punch. The SCHEDULER forms the node for the branches leading to the CLAMP and PUNCH subprograms. Each of the CLAMP and PUNCH is logically subservient to the SCHEDULING subprogram and the SCHEDULING subprogram is logically subservient as to the STATION subprogram as the former subprograms are operating generally at what would be considered a lower level of control. Nevertheless, the CLAMP and the PUNCH subprograms would necessarily communicate with the DIAGNOSTIC subprogram in order to provide the necessary data for the visual representation and the identification of malfunctions despite the lack of direct connection in the tree diagram of FIG. 4.

In summary, the tree structure of FIG. 4 is independent of the actual communications between the shells but reflects a categorization proposed by the programmer. As shown in FIG. 4, a second station subprogram, STATION 2 forms a root node for a branch having a second SCHEDULER subprogram which forms a root node for a branch having a PUNCH subprogram.

At a given branch and level in the tree structure, that is, any portion having a common root node, shells should have different names but otherwise shells need not have different names but may be identified by a path designation. For example, the shell holding the PUNCH subprogram and associated with STATION 2 subprogram may be designated as: "STATION 2/SCHEDULER/PUNCH and thus be uniquely distinguished from the PUNCH subprogram associated with the root node of the STATION 1 subprogram. Shells and their incorporated subprograms may thus be identified by their location in the tree structure. Each shell also has a unique key number independent of its path location and name.

Figure 6:
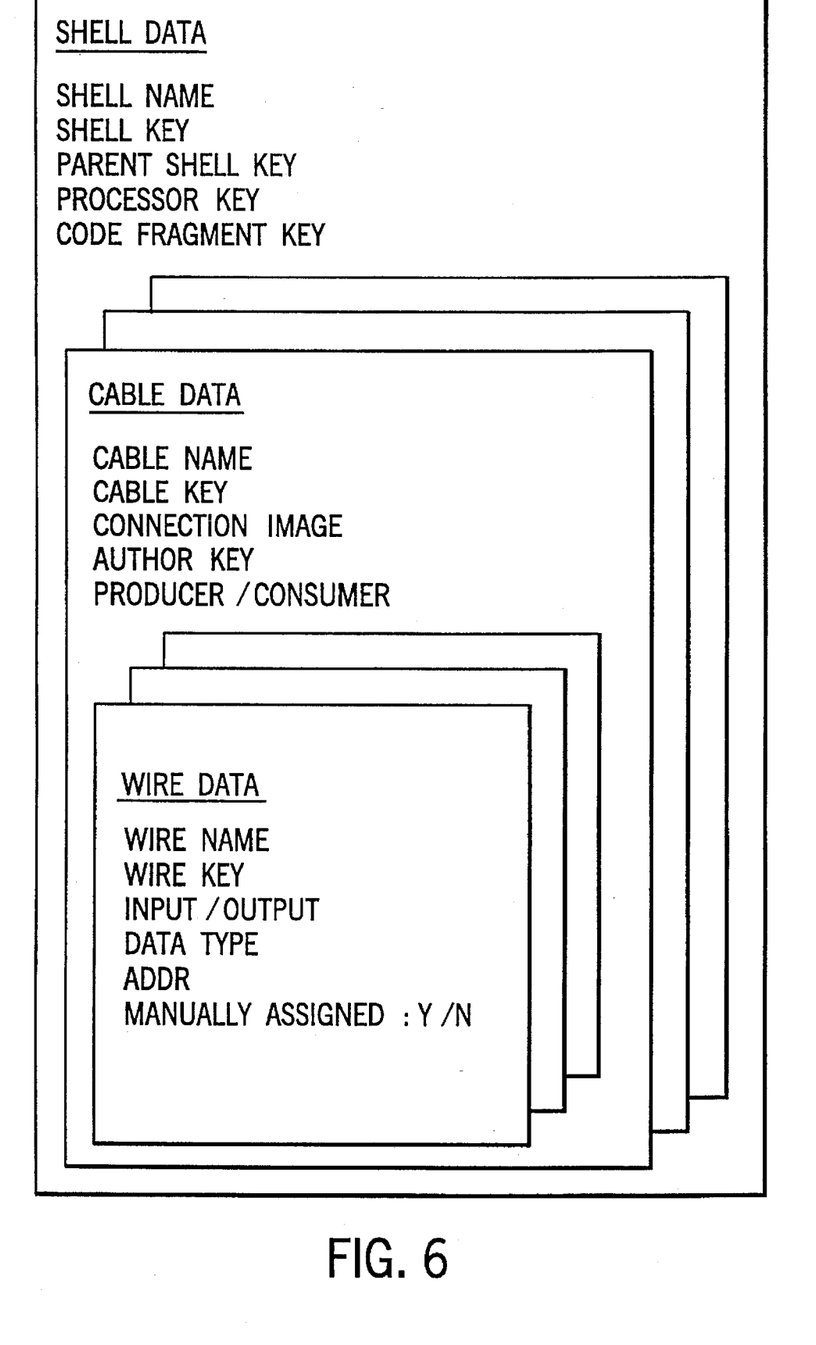
FIG. 6 is a table showing the information contained in the shells of FIG. 3.

As mentioned, the path form of identification is important in cutting and pasting subprograms into a larger program as it provides an additional dimension of information about the grouping of the program to assist the user in reconnecting cut and pasted subprograms as will be described. Referring now to FIG. 6, the shell header of each shell includes: information identifying the shell, the variables used by its associated subprogram characterized as to input/output and producer/consumer and certain connection information that is redundant with that in the connection database and which aids in the transporting of subprograms between programs with different connection databases. The variables are represented by wires within cables, each wire and cable having certain data associated with it. Table I shows the shell information of FIG. 6 for shell in a program having a tree structure of FIG. 4 holding the CLAMP subprogram.

TABLE I

| SHELL DATA | |
| --- | --- |
| Shell Name: | Clamp |
| Shell Key | 12345 |
| Parent Shell Key: | 23456 (Sched) |
| Processor Key | 12 (PLC-5) |
| Code Fragment Key | 345 (Clamp Subprogram) |
| CABLE DATA: | |

TABLE I-continued

SHELL DATA

| | |
|---|---|
| Cable Name: | Open |
| Cable Key: | 1 |
| Connection Image: | Diagnostic/Cable 2 |
| Author Key | 12345 (Clamp) |
| Producer/Consumer | Producer |
| WIRE DATA: | |
| | |
| Wire Name: | Open |
| Wire Key | 1 |
| Input/Output: | Output |
| Data Type: | Boolean |
| Address | N7:0/2 |
| Man. Assigned: | No |
| CABLE DATA: | |
| | |
| Cable Name: | Close |
| Cable Key: | 2 |
| Connection Image: | Diagnostic/Cable 3 |
| Author Key | 12345 (Clamp) |
| Producer/Consumer | Producer |
| WIRE DATA: | |
| | |
| Wire Name: | Close |
| Wire Key | 2 |
| Input/Output: | Output |
| Data TVpe: | Boolean |
| Address | N7:0/3 |
| Man. Assigned: | No |
| CABLE DATA: | |
| | |
| Cable Name: | Advance |
| Cable Key: | 3 |
| Connection Image: | Scheduler/Cable 2 |
| Author Key | 12345 (Clamp) |
| Producer/Consumer | Producer |
| WIRE DATA: | |
| | |
| Wire Name: | Advance |
| Wire Key | 3 |
| Input/Output: | Input |
| Data Type: | Boolean |
| Address | N7:0/6 |
| Man. Assigned: | No |
| CABLE DATA: | |
| | |
| Cable Name: | Retract |
| Cable Key: | 4 |
| Connection Image: | Scheduler/Cable 1 |
| Author Key | 12345 (Clamp) |
| Producer/Consumer | Producer |
| WIRE DATA: | |
| | |
| Wire Name: | Retract |
| Wire Key | 4 |
| Input/Output: | Input |
| Data Type: | Boolean |
| Address | N7:/0/8 |
| Man. Assigned: | No |

Shell Data

The first piece of information in each shell header is the name of the shell which is conveniently represented as an ASCII string but may, in fact, be any identifier according to the discussion of paths above. The name may be used in the depiction of the shells in tree form per FIG. 4 and together with the path of the tree structure, the name uniquely identifies each shell from all others in a program.

The next piece of information is a shell key which is a unique number for that shell, ideally within the universe of foreseeable applications. Such a key may be generated conveniently through a composite of a unique project number, referring to the overall program, together with a shell number unique within that project.

The key number of the parent of the shell is included next, that key which establishes the location of the shell within the tree diagram. For example, in the tree of FIG. 4, the parent of CLAMP associated with STATION 1 is SCHEDULER which in this example has a key number of 23456.

The parent information is followed by a processor key and a coded fragment key which serve to uniquely identify the physical processor on which the fragment runs (for multi-processor systems) and the location of the subprogram associated with the shell, which need not be stored with the shell. The latter feature permits each subprogram to be used by multiple shells.

Cable Data

The fundamental purpose of the shell is to explicitly define all the variables used globally by the subprogram of the shell. These variables are defined by means of "cables" 37 (referring metaphorically to electrical cables), each cable 37 collecting one or more "wires" (alluding to electrical wires within the cables). Cables 37 with multiple wires are used to clarify the connections between shells when multiple wires go to the same shell. Generally, however, a cable 37 will contain only a single wire. The CLAMP shell 35 has four cables 37, one for each input and output.

Each cable 37 is given a name, for example, "open" which refers to the variable transmitted on the cable 37. A cable key is a number uniquely identifying that cable 37 relative to that shell. This number aids in the construction of a connection database 36 as will be described. In the case of the cable 37 named "Open", the cable 37 key number is 1.

Also included in the cable data is the connection image, which as described above, identifies the shells to which the cable is connected by the path name of those shells. Thus for the "Open" cable, the connection image is the DIAGNOSTIC shell, and its second cable. Generally for a producer cable, the connection image will hold the path names of many shells, whereas for a consumer cable, the connection image will contain only a single shell path name.

The cable also indicates whether the cable is a producer or a consumer as has been described. As noted, identification of each cable as a producer or consumer is an important aspect of the present invention's facilitation of connections of code fragments. Finally the cable provides the key number of the shell that authored it. In this case the "Open" cable is indicated to have been authored by the Clamp Shell, indicating that the cable authored itself, e.g. no other shell historically acted as the model for the "Open" cable, but rather the structure of this cable was entered ab initio by the programer.

Wire Data

Each cable 37 may include one or wires going to the same shells as the cable. A cable may only connect with another cable having the same number of wires, type and opposite direction, opposite type (i.e. producer or consumer). In the present example, each cable has only a single wire given the same name as the cable. Thus, for example, in the cable "Open", there is only a single wire in that cable 37 also named "Open".

The wire data also provides a wire key number unique to that shell used to identify the wire's variable in the connection database. In this example, the wire "Open" is the first wire and its key is 1.

The wire data also indicates the type of data being transferred on the wire, e.g., integer, floating point, or Boolean, the latter which has one of two values. The wire list also provides the direction of the data flow with respect to the shell, e.g., input or output. In this case, the wire "Open" is an output wire providing data to other shells.

Each wire is also associated with an address which stores the wire's value. The address indicates the physical location of the variable in memory (after compilation) that is to be used to share values between shells and thus forms the mechanism for connecting cables and wires of shells together. That is, shells that have input wires read this address and shells that have output wires write to this address. If two shells are executed on different processors, different addresses may store connecting wire's value and the sharing is accomplished by processor to processor communication.

The next entry indicates whether the wire address was manually assigned. If it was, as may be the case for example if the address has some physical significance such as being an I/O address to a particular I/O device, then when the shells are recompiled, the address may not be changed according to the convenience of the compiler. On the other hand, if the address is not manually assigned, the addresses can be reallocated as the demands of memory require.

Three other cable 37s, each having one wire, are also described in this fashion in the shell for CLAMP. Each is given a successive cable reference number for each cable 37 and successive database ID for each wire.

The variables as described by the cable 37 and wire list are the essential features of the shells.

TABLE II

| Producer Shell Key | Cable | Consumer Shell Key | Cable |
| --- | --- | --- | --- |
| 12345 (Clamp) | Open | 41789 (Diag.) | Open |
| 12345 (Clamp | Close | 41789 (Diag.) | Close |
| 20358 (Sched.) | Advance | 12345 (Clamp) | Advance |
| 20358 (Sched.) | Retract | 12345 (Clamp | Retract |

Referring now to Table II, the actual linkage between variables of one shell and another is accomplished by means of a connection database 36 which lists in a first and second "column", a composite key number of the shell and a cable of a producer and links it to one or more consumer key numbers and cables in a third and fourth "column". Thus, the connection database 36 centrally collects the data that indicates the actual connections between variables of different shells regardless of the actual names of those variables.

For example, the "Open" variable of the Shell CLAMP is linked to a variable of the DIAGNOSTIC subprogram.

In this example, there are only a pair of shells sharing each variable, therefore the connection database is relatively simple. However, generally multiple variables at different shells may communicate data among themselves resulting in multiple entries, the consumer column of a given "row" of the connection database 36.

Creation of the Shell Data and Compilation of the Subprograms

In practice, the shells and their header information are to be generated during the program writing process by the programmer according to a prewritten framework imported into the program editor. Although the database may be manually compiled, it is preferably generated automatically by an interactive program which connects shells together by displaying a picture of the tree structure of FIG. 4 and querying the programmer to thus develop the needed path names. Menus displaying the cables and wire names for each shell may be displayed as a shell is selected by a cursor on the workstation 30. Connections are then indicated by drawing lines on the display of the workstation 30 between shells using a cursor control device such as is understood in the art.

The present data structure refers to the source code to be received by a compiler to generate a machine executable code. Such compilers are well understood in the art and serve as one of their functions to allocate memory locations for particular variables within the program. In the present invention, this allocation is performed based on the connection database which provides a comprehensive list of all the shells using a particular variable and the various names used to designate that variable within the shell. The compiler simply substitutes a physical address for these variable names in the compiled program. The type of variable necessary for determining the amount of memory needed to be allocated to each variable is readily determined by reference to the wires within the shell.

Where producer inputs are detected by examining the shells, the compiler provides additional code invoking a priority rule to eliminate data contentions according to a predetermined priority rule as selected by the programmer according the context of the application.

During the writing of the program, the connection database can be printed out to generate a cross-reference table useful for troubleshooting a particular program. Comparison of the connection database to the headers of the shell readily provides information indicating shells which are misconnected or unconnected. Such a process will also clearly indicate orphan variables belonging to no subprogram.

This clear laying out of the interaction between various subprograms within a larger program will, in general, assist the programmer in writing troublefree code but also increases the reusability of particular code portions by permitting cutting and pasting.

Cutting and Pasting Subprograms

Referring now to FIG. 5, a given subprogram as encapsulated in a shell 35 may be cut or copied to be used in another program or another part of the program. Once the subprogram is removed from its context of the larger program, the shell header may be used to provide an indication of the cables 37 that need to be attached for the shell to be operative in its new environment. In the case of the CLAMP shell, "Open" and "Close" output cables 37 need to be attached and "Advance" and "Retract" input cables 37 need to be attached for the CLAMP subprogram to operate.

The explicit definition of the necessary variables in the header of the shell simplifies this reconnection process but making reconnections may be further aided by reference to the logical context of the previous connections of these variables implicit in the tree diagram of the source program.

For example, and referring to FIG. 4, in the construction of two identical program stations in a control system, having subprograms STATION 1 and STATION 2, such as shown generally in FIG. 4, it may be desirable to copy the CLAMP shell from STATION 1 to STATION 2. This may be interpreted as the desire to reuse the subprogram CLAMP in a new portion of code including the subprogram STATION 2. Because of the similarities of the station subprograms, reflecting the similarities of the hardware composing the stations, it is likely that the SCHEDULER of STATION 2 already has necessary variables which may be used to control the clamp 23. The information implicit in the tree diagram of the original or source program can assist the programmer in identifying these variables and the necessary connections.

Once the CLAMP shell has been copied, its new location in the tree structure must be designated. In one example, it may be placed at the same tree level as the PUNCH shell of STATION 2, that position being shown in dotted lines in FIG. 4.

After the clamp shell is pasted at the location indicated in FIG. 4, the shell header is updated. First, the parent may be updated. In this case, the parent is still SCHEDULER and so no change is required. Likewise, the cable key numbers which are relative to that shell are all still correct and all that is missing for the code to be operative is for the cables indicated in FIG. 5 to be reconnected to the proper shells.

Referring to Table I, as mentioned, each shell keeps a connection image of its previous connections to other cables of other shells. This connection image list may be used to reconnect the shell to the program. The entry in the connection image list is the shell and cable for a particular variable. This path name is relative to the shell, thus it is effectively abbreviated to eliminate portions that are in common with the shell holding the connection image list. This connection image list improves the portability of the shell to programs remote from the connection database 36.

An automatic reconnection procedure using the connection image list may be invoked. In this procedure, a copied and pasted shell is reconnected according to the paths previously indicated in the connection database and reflected in the connection image list but as interpreted from the new paste position. Thus, the CLAMP shell in connecting the ADVANCE and RETRACT cables to SCHEDULE looks not to the SCHEDULE shell under STATION 1 but to the SCHEDULE shell under STATION 2 based on the abbreviated path name. This connection is accomplished by a tree search based on the current paste position in which the shell indicated in the connection image list or the connection database is searched for at each level of the tree, from bottom (branches) up (to roots), until a matching shell is found. This procedure connects the "Advance" and "Retract" cables of the pasted CLAMP shell to the SCHEDULE subprogram under STATION 2. Thus, an auto connection may be effected by searching for local matches to the previous connections and recording those in the connection database. The key numbers of this connection are recorded in the connection database 36.

Following a similar procedure, an auto connection may be effected for cables 1 and 2 of the copied CLAMP shell which are outputs indicated to connect to the shell DIAGNOSTIC. In this case, the search through the hierarchy of the tree up to the node of STATION reveals no DIAGNOSTIC shell at station 2 and therefore the program continues searching until the DIAGNOSTIC block is found beneath STATION 1. A connection to this DIAGNOSTIC shell and its cables is then formed.

In each of these cases, the cables of the Clamp shell are indicated to be authored by the Clamp shell. Accordingly, the autoconnection process adds new variables (cables and wires) to the shells indicated in the connection process. These new variables are not yet used by the subprograms of the shells, either because they are not identified to their counterparts in the subprograms or because the subprograms do not use these variables yet. This creation of these variables, however, provides both a place holder for the connection and a reminder to the programmer that additional connection work is necessary.

Thus, in the present example where the CLAMP shell is copied to a similar environment, the auto connection feature based on information implicit in the tree structure permits near perfect reconnection of the software to the proper shells without operator intervention. Operator confirmation is always requested of every connection, however, as there is no way, based on the information incorporated into the program, to be certain that the previous connections indicated by the tree structure of the source program should be continued throughout the remaining program when a particular subprogram is copied and pasted.

Thus, by externalizing the connections between shells and using the information implicit in a tree structure linking the shells, certain automatic reconnection of shells may be accomplished.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. An industrial controller comprising:
   at least one processor for executing a first program portion, the first program portion having a first variable with a value shared with at least one second variable of a second program portion
   an electronic memory communicating with the at least one processor, the memory storing a data structure including:
   (i) a first shell associated with the first program portion including a list identifying the first variable and whether the first variable is a consumer or producer with respect to that second program portion and whether the first variable is an input or output with respect to that first to program portion, the shell further having a first unique key number;
   (ii) a second shell associated with the second program portion including a list identifying the second variable and whether the second variable is a consumer or producer with respect to that first program portion and whether the second variable is an input or output with respect to that second program portion, the shell further having a second unique key number; and
   (iii) a connection database shared by the shells having database entries linking the first variable of the first shell, identified by the first unique key number and its status as a consumer or producer, with the second variable of the second shell identified by the second unique key number and its status as a consumer or producer;
   wherein a compiler operating on this data structure may identify potential data contentions resulting from multiple output consumer variables being connected to a producer input variable and resolve those contentions by a predetermined priority rule.

2. The industrial controller of claim 1 wherein the list of the first shell also indicates a key number of a shell that is the author of the first variable, the author being a variable that formed a model for the first variable.

3. The industrial controller of claim 1 wherein the shells include data identifying the processor on which the program portions may run.

4. A method of compiling a program of an industrial controller for operation on at least one processor, the program including a first program portion associated with a first shell, the first shell including a list identifying a first variable and whether the first variable is a consumer or producer with respect to the first program portion and whether the first variable is an input or output with respect to the first program, the program also including a second program portion associated with a second shell, the second shell including a list identifying a second variable and whether the second variable is a consumer or producer with respect to the second program portion and whether the second variable is an input or output with respect to the second program portion, the shell further having a second unique key number, the program also including a connection database having database entries linking the first variable of the first shell, identified by the first unique key number and its status as a consumer or producer, with the second variable of the second shell identified by the second unique key number and its status as a consumer or producer, the compilation comprising the steps of:
   a) identifying potential data contentions resulting from one of the first and second variables sharing data with a third variable and being one of a consumer output and a producer input as indicated by the connection data base;
   b) establishing the connections indicated by the connection data base using a predetermined priority rule to resolve contentions of the connection identified in step (a).

5. The method of claim 4 wherein the predetermined priority rule is that a first-in-time consumer output providing a value to a producer input blocks all other consumer outputs variable until that first-in-time consumer output indicates it is no longer providing a value to the producer input.

6. The method of claim 4 wherein the connections are established per step (b) by providing the first and second variable with a common memory address for storing their shared value.

7. A method of cutting and pasting a primary program portion within a larger program of an industrial controller wherein the larger program is divided into secondary program portions where each of the primary and secondary program portions are associated with shells having a list identifying each input variable and each output variable of the programs of the shells; the shells further having a first unique key number defined as their location within a user defined tree structure of the shells, comprising the steps of:
   a) identifying a paste location of the primary program portion within the tree of shells;
   b) reviewing the list of the shell of the primary program to identify input and output variables for that shell;
   c) determining the key number of shells of the secondary programs previously sharing values of the identified input and output variables for the shell of the primary program;
   d) searching the tree of shells for the locations of shells of secondary programs determined in step (c); and
   e) writing to a connection database to establish a connection between the shell of the primary program and at least one shell of the secondary program for a shared variable based on those shells found in the search of step (d), the connection database having database entries linking the shared variables of the shells identified by key number and their status as a consumer or producer.

8. The method of claim 7 wherein determining the key number of shells of the secondary programs previously sharing values of the identified input and output variables for the shell of the primary program is made by reviewing information contained in the shell.

9. The method of claim 7 wherein the list of the first and second shells also identifies a shell that is the author of the first variable and second variable, the author being a variable that formed a model for the first variable; and including before step (e) the step of:
   generating a new variable in the shell of the secondary program if the shell of the primary program is the author of the shared variable.

* * * * *